United States Patent [19]

Chizinsky

[11] 4,008,729
[45] Feb. 22, 1977

[54] SOLVENT ARTICLE CLEANER

[76] Inventor: George Chizinsky, 9 Lombard St., South Portland, Maine 04106

[22] Filed: Oct. 23, 1973

[21] Appl. No.: 408,802

Related U.S. Application Data

[63] Continuation-in-part of Ser. No. 276,229, July 28, 1972, abandoned.

[52] U.S. Cl. .......................... 134/107; 23/272.6 S; 99/293; 134/108; 202/170
[51] Int. Cl.² .................. A47J 31/10; B01D 11/02; B08B 3/08
[58] Field of Search .......................... 134/105–108; 99/293, 294; 23/272.6 S; 202/170, 170 D

[56] References Cited

UNITED STATES PATENTS

| | | | |
|---|---|---|---|
| 249,565 | 11/1881 | Wilson | 99/293 |
| 253,379 | 2/1882 | Hart | 23/272.6 S |
| 953,073 | 3/1910 | Trillich | 23/272.6 S UX |
| 1,358,048 | 11/1920 | Anhaltzer | 202/170 |
| 1,468,961 | 9/1923 | Cary-Curr | 23/272.6 S X |
| 2,101,819 | 12/1937 | Roerich | 202/170 |
| 3,472,152 | 10/1969 | Broadwin | 202/170 |

FOREIGN PATENTS OR APPLICATIONS

| | | | |
|---|---|---|---|
| 662,742 | 3/1929 | France | 134/105 |
| 50,741 | 9/1917 | Sweden | 23/272.6 S |

OTHER PUBLICATIONS

IBM Technical Disclosure Bulletin, vol. 1, No. 5 – Feb. 1969, "Vacuum Extraction".

Primary Examiner—Daniel Blum
Attorney, Agent, or Firm—Thomas C. Stover, Jr.

[57] ABSTRACT

Apparatus for cleaning articles in volatile solvent is provided wherein the article to be cleaned is situated in a solvent collector with siphon tube attached above a reservoir of solvent and below a water-cooled vapor condenser, the solvent being heated to boiling to generate solvent vapors to bathe the article in solvent vapors and condensate which forms on the condenser and drips into the collector below to wash impurities from the article, the condensed solvent also boiling and rising in the collector until the siphon height is reached, whereupon solvent and impurities siphon from the collector and the cleaning cycle recommences.

7 Claims, 1 Drawing Figure

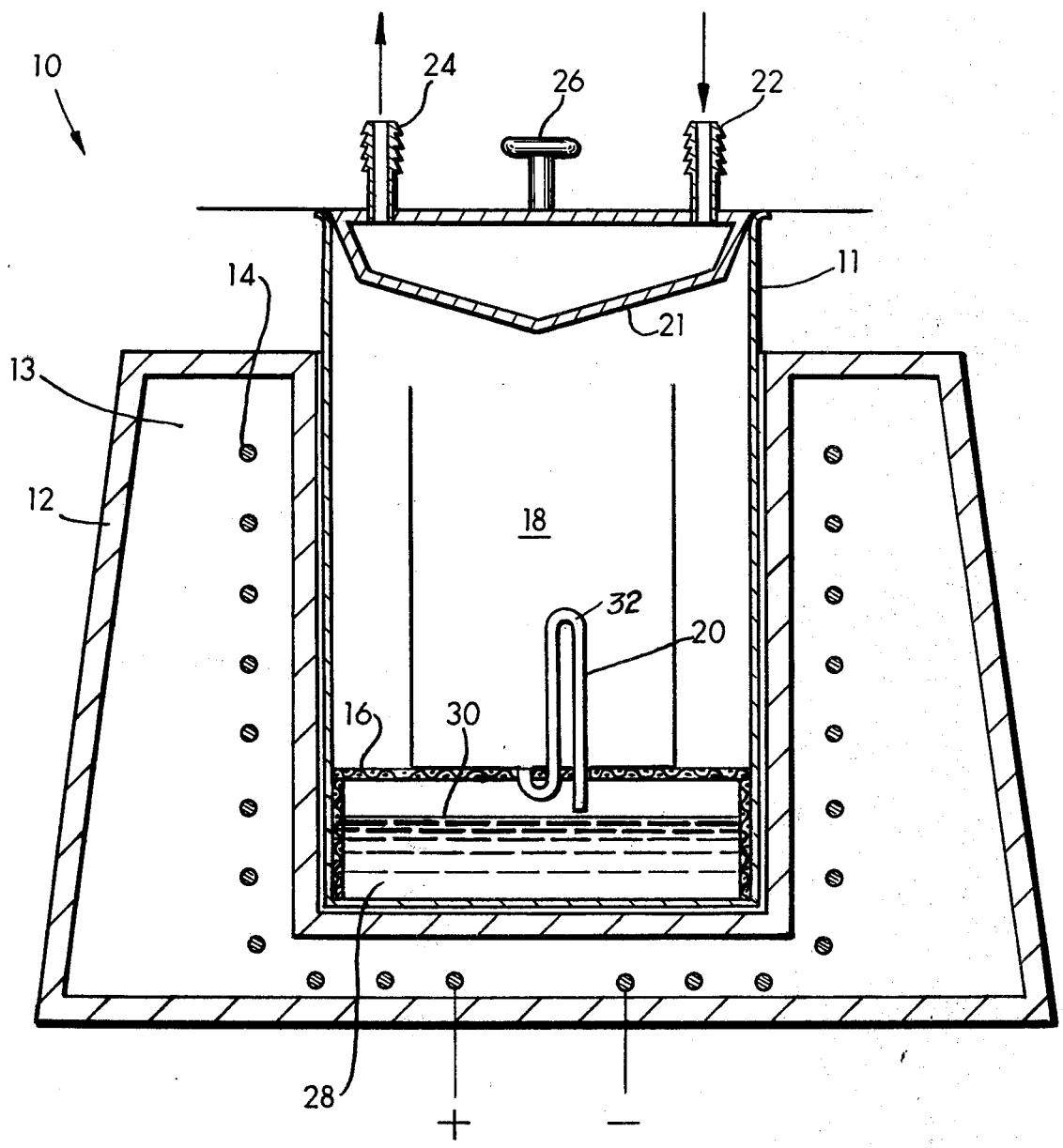

SOLVENT ARTICLE CLEANER

The following is a continuation-in-part of applicant's copending application Ser. No. 276,229, filed July 28, 1972 now abandoned.

FIELD OF THE INVENTION

This invention relates to extraction of materials, particularly extraction of impurities or chemicals from various materials including articles.

THE PRIOR ART

It is frequently necessary to clean including degrease materials and other articles with volatile solvents in commercial, industrial and other applications, for example, to degrease metal castings, plates, wire and other articles preparatory to reuse thereof.

Various methods of volatile solvent cleaning of articles have been proposed including bathing an article in a condensed stream of volatile solvent, immersing an article in a hot liquid solvent, bathing an article in the vapors of a volatile solvent; see U.S. Pat. No. 1,961,867 to Savage, U.S. Pat. No. 2,113,129 to Dinley and U.S. Pat. No. 2,732,322 to Murray. None of the above methods have provided the thorough procedure of bathing the article in solvent vapors and condensate and immersion thereof, with periodic removal of solvent and impurities or other components by siphon. In a laboratory equipment catalog entitled *SGA Scientific, Inc., Bloomfield, N.J.* (1972) page 329 at paragraph E 8625, *Extraction Apparatus* there is disclosed an apparatus having hung from a tin coil condenser, a 65 mm long by 30 mm diameter extraction cup with siphon within a 400 ml glass flask, which unit permits boiling a liquid solvent in the bottom of the flask, the vapors rising, condensing on the condenser, and dripping into the extraction cup to bathe the articles or materials therein, the level of condensed solvent rising in the cup until the siphon height is reached and then solvent and dissolved components, including impurities, siphon out the cup to the bottom of the flask, recommencing the extraction cycle. However, the design of this unit is aimed at measurements or analyses of ingredients in samples and not a speedy cleaning cycle of articles or materials; and this unit, even if enlarged, cannot meet the time requirements of cleaning articles in a commercial or industrialized operation, and there is a need and market for an article cleaner that can clean relatively large articles or materials or extract components therefrom at a speedy turnover rate.

There has now been developed an article cleaner that employs the vapors and condensate of volatile solvents to clean articles thoroughly in a fast, efficient manner.

SUMMARY

Broadly, the present invention provides an apparatus for cleaning articles comprising, a container for volatile liquid solvent; a condensate collector open at the top thereof situated within the container above the liquid level of the solvent; a broad-surfaced liquid condenser mounted in the upper portion of the container, above the condensate collector; means for placing the article to be cleaned into the collector; means for heating the solvent to an elevated vapor release temperature therefor, the solvent vapors bathing the article and liquifying on the condenser and flowing onto the article in the collector and accumulating therein, washing components from the article; and means for drawing off the solvent and components from the article and collector when the condensed solvent has reached a predetermined level.

In the article cleaner of the invention, the condensate collector is separable from the condenser permitting facile introduction or removal of articles to be cleaned.

DESCRIPTION

The invention will become more apparent from the following detailed specification and drawing, in which:

FIG. 1 is a sectional elevation view of the article cleaner embodying the present invention.

Referring now to the drawing, article cleaner 10 has sump vessel 11 partially enclosed in heating jacket 12, which jacket has electric coils 14 for heating the surrounding air medium 13 and the solvent 28 therein as shown in FIG. 1. Sump vessel 11 contains condensate collector 18 with siphon pipe 20 attached to the bottom thereof, situated on staging 16 therein, above the liquid solvent level 30 as shown in FIG. 1. Above condensate collector 18, which is open at the top, is situated broad surfaced conical condenser 21 having an apex which is water-cooled by inlet duct 22 and outlet duct 24; the condenser 21 having a handle 26 for ease of positioning as shown in FIG. 1.

In operation, the article or articles to be cleaned are placed in the condensate collector 18, solvent 28 is poured into the bottom of the sump vessel 11 up to liquid solvent level 30 and the condenser cover 21 is positioned in place. The heating jacket coils 14 are turned on to heat the solvent to boiling. The solvent vapors fill the sump vessel 11, bathing the article to be cleaned and condensing on the condenser 21. The solvent condensate runs down the condenser surfaces to the apex and then drips or flows into the collector 18 washing and dissolving impurities from the article therein. The condensate accumulates in the collector 18 until it reaches the siphon level 32, whereupon the accumulated solvent and impurities are siphoned out of the collector 18 and the cycle recommences with the accumulation of more solvent condensate in the collector 18, so that the article to be cleaned is subjected to successive washings of hot solvent and solvent vapor until it is thoroughly cleaned or the desired materials thoroughly extracted from the article or material.

It has been found in the present invention that the most thorough and the fastest cleaning of articles is obtained when the solution in the sump and in the collector is brought to a boil. At boiling the solvent is at its highest and most effective temperature to dissolve or extract materials. Moreover, the boiling solvent provides a scrubbing and circulation action on the article to be cleaned, especially in crevices and apertures thereof to more thoroughly and quickly clean the article. Thus, the apparatus embodying the present invention heats both sump and collector solutions to boiling to best clean an article or extract materials in the shortest time.

Because of the broad conical shape of the condenser surface, the condensate flows to the apex thereof and accumulates in the collector in a rapid manner and the article is processed (cleaned, extracted) in a relatively short and feasible time. Because the condenser 21 is not attached to the collector 18, articles can readily be removed and inserted into the collector without removing the latter from the heating jacket. The heating jacket contacts and heats at least the bottom of the sump vessel and preferably heats the bottom and sides thereof as well. Although various types of heating units can be employed, electrical, gas or oil, solar and the like, the heating jacket is preferably an electrically heated jacket, e.g. a jacket containing an insulated electric coil in a medium of water or air, preferably the latter. The heating jacket preferably surrounds the sump vessel at the bottom and on the sides thereof below the condenser, so that the solvent liquid and vapor are rapidly heated.

The condensate collector can be any convenient size for high rate cleaning of large articles, e.g. 12 inches diameter by 24 inches high. The collector has a siphon pipe at the bottom thereof which bends upward to a desired height on the collector so as to permit the inundation of the article cleaned, e.g. 18 inches, the pipe then extends downwardly below the collector. The sump vessel is of a size to readily enclose the condensate collector, e.g. 14 inches by 36 inches high.

The condenser is of as large a size in surface area as possible for high volume condensation of solvent vapor and covers the top of the sump vessel, e.g. about 14 inches in diameter for the above sump vessel. The condenser can take various shapes, angular, rounded and the like, but preferably slopes downward to a point situated above the condensate collector for the flow of condensate thereto. A condenser with a conical-surfaced underside is preferred. The condenser is cooled by any convenient means and is preferably water-cooled.

The condensate collector support within the sump vessel is advantageously a network which holds the collector and the siphon pipe above the liquid solvent level in the sump vessel. The network can be a metal cross, a wire mesh and the like. The articles to be cleaned can be various industrial and laboratory or other articles and materials including metal, glass, plastic or other composition parts not soluble in or reactive with the solvent used, such as fittings, machined objects, optical parts, silicon wafers, electronic parts and the like.

Articles are placed in the apparatus of the invention, including the condensate collector, by hand, tools including clamps, or any other suitable means.

As used herein, "articles" includes "materials".

The types of solvent employed depend on the impurities or solutes being removed and can include water, carbon tetrachloride, trichloroethylene, acetone, isopropyl alcohol and any inorganic or organic liquid or mixture having solvent properties.

The apparatus of the invention can also be employed to components including impurities from materials or a chemical or chemicals from a substance or materials. As used herein, "cleaning" includes "extraction" of components from the article treated.

The apparatus of the invention can also advantageously be employed to make coffee by placing coffee beans or grounds in a porous container within the collector and water in the sump vessel and by recycling the water vapor and condensate, progressively increasing the coffee concentration in the sump vessel.

Thus as defined, the apparatus of the invention serves to clean and extract impurities and components from articles and materials, employing the above porous container where desired.

The following example serves to illustrate the invention, but should not be construed in limitation thereof.

EXAMPLE 1

In a glass condensate collector 3¾ inches diameter by 5⅝ inches in height was placed a round Teflon carrier containing 25 silicon wafers of 1¼ inches diameter, 7 mils in thickness, the wafers being held in an upright position by slots in the carrier radiating from the center. The carrier was equipped with a 6 inches long Teflon handle projecting up from center thereof. The collector was placed upon a stainless steel cross-shaped support 6 inches across and 2 inches high, which was resting on the bottom of a glass sump vessel 6¼ inches diameter by 10 inches in height, to which had already been added 600 ml. of trichloroethylene. The sump vessel was sitting in a heating jacket which enclosed the bottom and two-thirds of the height of the sump vessel. The dial control on the heating jacket was set at a position which would allow the trichloroethylene to boil both in the sump vessel and in the condensate collector. The condenser cover was placed on top of the sump vessel and a small flow of cooling water was allowed to flow through the condenser cover. As soon as the trichloroethylene started to boil, its vapors began condensing on the water-cooled cover and the droplets accumulating on the bottom side of the cover would roll down to the apex of the cone shaped cover and pour into the condensate collector. The collecting condensate itself commenced to boil. When the level of the boiling condensate in the collector reached the top of the siphon which extended 2¼ inches above the bottom of the collector, the condensate commenced to pour through the siphon back into the sump vessel. The siphon action continued until virtually all of the condensate in the collector had drained out, whereupon the process repeated itself for successive cycles.

By the above procedure the wafers were thoroughly cleaned in 15 minutes and the heating supply was shut off.

What is claimed is:

1. An apparatus for cleaning articles comprising, a container for volatile liquid solvent, a condensate collector open at the top thereof situated within said container above the liquid level of said solvent, a broad-surfaced liquid cooled condenser mounted in the upper portion of said container above the condensate collector; common heating means including a heating jacket which surrounds said container below said condenser and at least the lower part of the within collector for heating the solvent container and the within collector sufficiently to heat the solvent in the container to boiling, the solvent vapors bathing said articles and liquifying on said condenser and flowing onto said articles in said collector and accumulating therein and sufficiently to heat the liquid in said collector to boiling to vigorously wash components from said articles and means for automatically drawing off said solvent and components from said articles and collector when the condensed solvent has reached a predetermined level.

2. The apparatus of claim 1 wherein said condenser is water-cooled and said heating jacket is heated by an electric coil.

3. The apparatus of claim 1 wherein said condenser is a cone which slopes downwardly to a point, the point being situated over the condensate collector opening.

4. The apparatus of claim 1 wherein the drawing off means is a siphon pipe attached to the bottom of said collector and communicating therewith, said pipe extending upward to a desired level on said collector and then bending downward and extending below the bottom of said collector and other portions of said pipe.

5. The apparatus of claim 1 wherein said collector sits on an open network staging within said container.

6. The apparatus of claim 1 having a basket fitting within said collector for supporting at least one article to be cleaned therein.

7. The apparatus of claim 1 wherein the article to be treated is a chemical substance and condensed solvent is employed to extract certain chemical ingredients therefrom.

* * * * *